United States Patent
Furukawa et al.

(10) Patent No.: US 8,327,156 B2
(45) Date of Patent: Dec. 4, 2012

(54) EMBEDDED DEVICE HAVING COUNTERMEASURE FUNCTION AGAINST FAULT ATTACK

(75) Inventors: Kazuyoshi Furukawa, Kawasaki (JP); Kouichi Itoh, Kawasaki (JP); Masahiko Takenaka, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 403 days.

(21) Appl. No.: 12/560,222

(22) Filed: Sep. 15, 2009

(65) Prior Publication Data
US 2010/0031055 A1  Feb. 4, 2010

Related U.S. Application Data

(63) Continuation of application No. PCT/JP2007/000252, filed on Mar. 19, 2007.

(51) Int. Cl.
*G06F 21/00* (2006.01)
(52) U.S. Cl. .......................... 713/189; 380/28; 708/491
(58) Field of Classification Search .................. 713/189; 708/491; 380/28
See application file for complete search history.

(56) References Cited

U.S. PATENT DOCUMENTS

| | | | | |
|---|---|---|---|---|
| 6,298,442 | B1 * | 10/2001 | Kocher et al. | 713/194 |
| 2003/0163760 | A1 * | 8/2003 | Watanabe et al. | 714/10 |
| 2005/0165876 | A1 | 7/2005 | Mukaida et al. | |
| 2008/0104402 | A1 * | 5/2008 | Gueron et al. | 713/176 |

FOREIGN PATENT DOCUMENTS

| | | |
|---|---|---|
| JP | A 2005-209095 | 8/2005 |
| WO | WO 2005/124578 A2 | 12/2005 |

OTHER PUBLICATIONS

Bayat-Saramdi et al., Concurrent Error Detection in Polynomial Basis Multiplication Using Linear Codes, Sep. 15, 2006, Retrieved from http://www.cacr.math.uwaterloo.ca/techreports/2006/cacr2006-31.pdf, pp. 1-15.*
Notice of Rejection Grounds issued in corresponding Japanese Patent App. No. 2009-504908, issued Sep. 6, 2011 (with partial translation).
Extended European Search Report dated Oct. 10, 2011.
Shay Gueron; "Enhanced Montgomery Multiplication"; Cryptographic Hardware and Embedded Systems, Internationalworkshop; pp. 46-56; Aug. 13, 2002.
Gunnar Gaubatz et al.; "Non-linear Residue Codes for Robust Public-Key Arithmetic"; Fault Diagnosis and Tolerance in Cryptography Lecture Notes in Computer science; LNCS, Springer, Berlin, Germany; pp. 173-184; Jan. 1, 2006.

(Continued)

*Primary Examiner* — Carl Colin
*Assistant Examiner* — Chau Le
(74) *Attorney, Agent, or Firm* — Fujitsu Patent Center

(57) ABSTRACT

A cryptographic processing device, comprising: a storage unit; initial setting unit for setting a value to be stored in the storage unit; Montgomery modular multiplication operation unit for performing a Montgomery modular multiplication operation plural times for a value set by the initial setting unit; and fault attack detection unit for determining whether or not a fault attack occurred for each of at least some parts of the Montgomery modular multiplication operations performed plural times.

15 Claims, 13 Drawing Sheets

OTHER PUBLICATIONS

Colin D. Walter; "Data Integrity in Hardware for Modular Arithmetic"; Cryptographic Hardware and Embedded Systems, $2^{nd}$ International Workshop; Worchester, MA; Aug. 17-18, 2000; [Lecture notes in computer science], Berlin, Springer, Germany vol. 1965; Aug. 17, 2000; pp. 204-215.

Dan Boneh, et al., "On the Importance of Checking Cryptographic Protocols for Faults," in W. Fumy, editor, Advances in Cryptology-EUROCRYPT' 97, vol. 1233 of Lecture Notes in Computer Science, Springer-Verlag, pp. 37-51, 1997.

Ingrid Biehl, et al., "Differential Fault Attacks on Elliptic Curve Cryptosystems," Advances in Cryptology-CRYPT 2000, vol. 1880 of Lecture Notes in Computer Science, Springer-Verlag, pp. 131-146, 2000.

Stephen R. Dusse, et al., "A Cryptographic Library for the Motorola DSP56000," Advances in Cryptology-EUROCRYPTO '90 (LNCS 473); pp. 230-244, 1990.

Kenji Mukaida, et al., "Design of High-Speed Montgomery Modular Multiplier," The 2004 Symposium on Cryptography and Information Security, (Sendai, Japan), The Institute of Electronics Information and Communication Engineers, Jan. 27-30, 2004.

Che-Wun Chiou, et al., Concurrent Error Detection in Montgomery Multiplication over $GF(2^m)$, IEICE Transactions on Fundamentals of Electronics, Communications and Computer Science, vol. E89-A, No. 2, pp. 566-574, Jan. 25, 2006.

\* cited by examiner

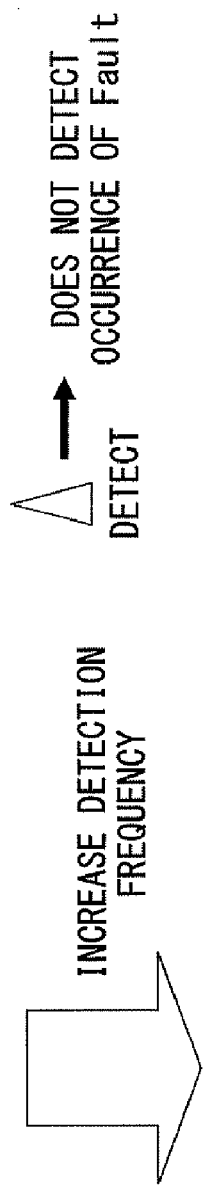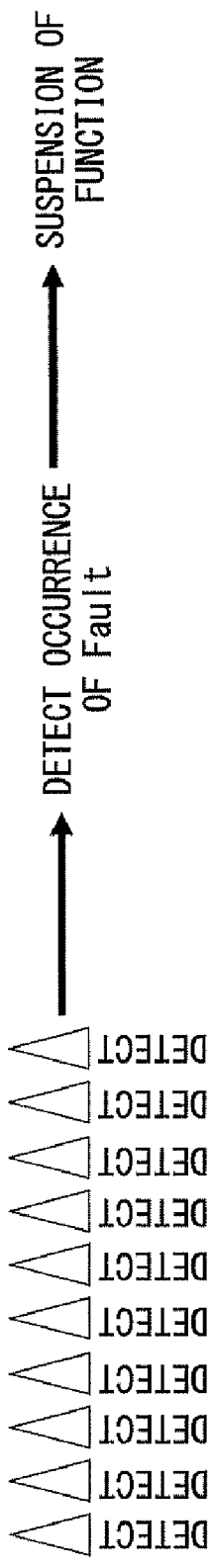
F I G. 5

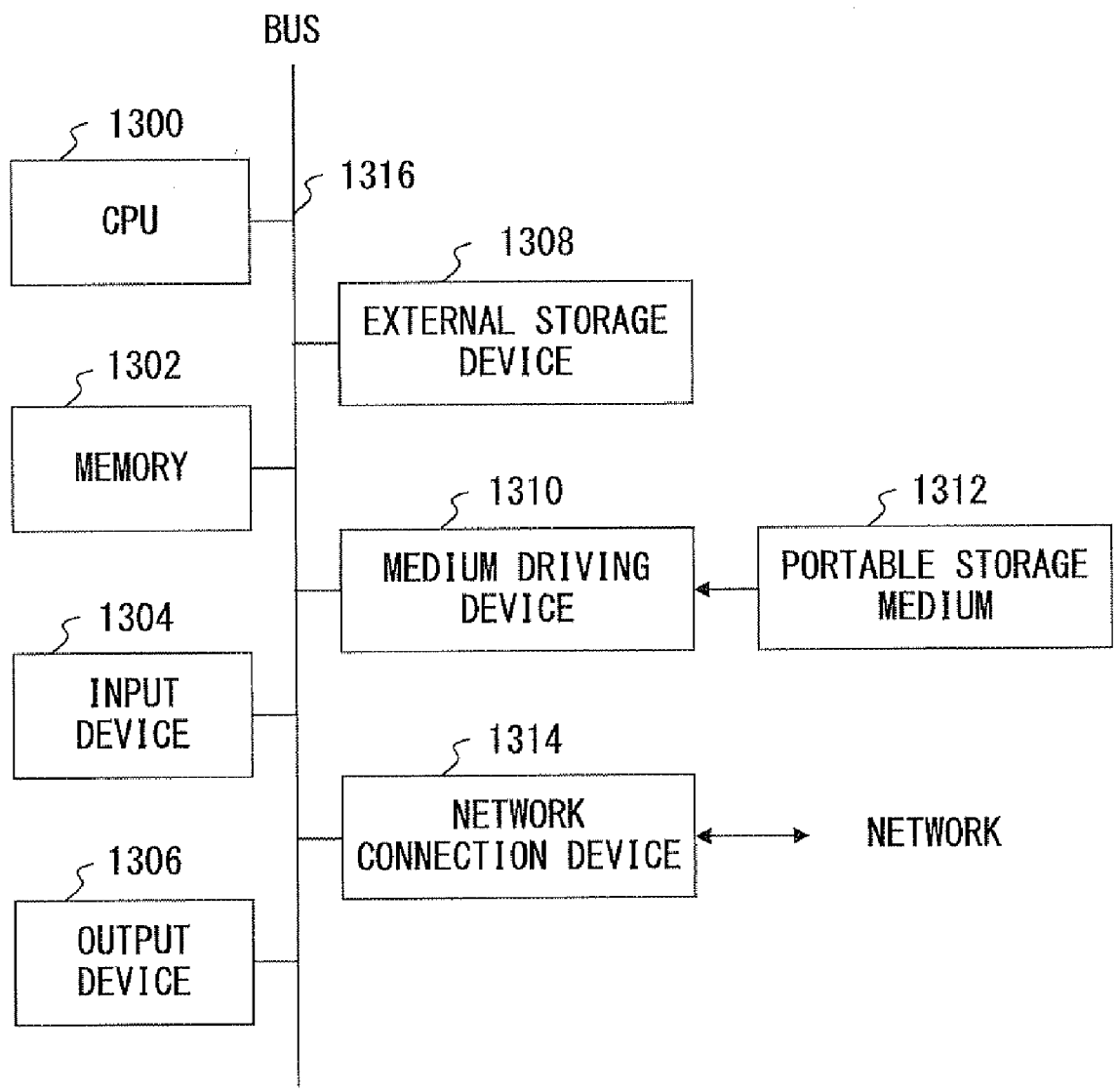
F I G. 13

EMBEDDED DEVICE HAVING COUNTERMEASURE FUNCTION AGAINST FAULT ATTACK

CROSS REFERENCE TO RELATED APPLICATIONS

This application is a continuation application of International PCT Application No. PCT/JP2007/000252, filed on Mar. 19, 2007, the disclosure of which is hereby incorporated by reference herein.

FIELD

The embodiments discussed herein are related to a device having a countermeasure function of detecting and preventing a fault attack in the field of cryptography, a method of detecting a fault attack, and a program for implementing the same.

BACKGROUND

[Overview of Cryptographic Methods and Tamper Proof Technologies]

Cryptography is a technique of protecting information from tapping or falsification. Cryptographic methods that have spread recently can roughly be classified into two categories, public-key cryptography and symmetric-key cryptography. Public-key cryptography uses different keys respectively for encryption and decryption, and publishes the key for encryption (public key) to the public while handling, as secret information, the key used for decrypting the encrypted text (secret key) so that only the receiver can access the secret key in order to ensure security. By contrast, symmetric-key cryptography uses the same key (secret key) for encryption and decryption, and prevents a third person, i.e., a person who is neither the transmitter nor the receiver, from accessing the key in order to ensure security.

Among the techniques in the field of cryptography, there is a technique called tamper proof technology. Tamper proof technology is used for preventing secret information such as a secret key or the like from being leaked due to attacks made by malicious third parties. ISO15408, one of the international standards for security, requires that a smart card included in a device such as an embedded device having a cryptographic function be based on a tamper proof technology.

Tamper proof technology targets various attacking methods. A particularly important attacking method is a method called a fault attack, which was made public by Boneh, DeMillo, and Lipton in 1997. A fault attack applies various stresses (such as abnormal clocks, excessive voltage, high temperature or the like) to the circuit of the cryptographic processor in an embedded device for a smart card or the like so as to cause abnormal values in the internal data in the circuit in order to crack the key information in the cryptographic processor. Non-Patent Document 1 should be referred to for more detailed information on the above described fault attack.

It is known that the use of a fault attack enables the cracking of the secret key in a cryptographic processor regardless of whether the information is encrypted by public-key cryptography or symmetric-key cryptography. Particularly, a fault attack to public-key cryptography, which is referred to as RSA cryptography in Non-Patent Document 1, is considered to be a great threat because the implementation of this attack is easy for attackers. As another fault attack to public-key cryptography, a fault attack to elliptic curve cryptography (ECC) is also known (see Non-Patent Document 2 for detailed information). Countermeasure against these fault attacks to public-key cryptography is an important problem in the field of tamper proof technology.

[Public-Key Cryptography]

Hereinbelow, public-key cryptography will be explained as the conventional technique on which the present invention is based.

[a. Binary Method]

RSA and ECC are known as representative algorithms for public-key cryptography. In a processor employing RSA cryptography, a process called an modular exponent operation is executed. A modular exponent operation is a process in which calculations are performed in order to obtain a V that satisfies $V=a^d$ (mod n) where d represents an exponent, a represents a message, and n represents a public key. The binary method described below as algorithm 1 is known as an algorithm for executing this process effectively.

<Algorithm 1: Exponent Remainder Operation Using Binary Method>

Input
d: exponent
u: bit length of d
a: cardinal number
n: modulus
Output
$v=a^d$ (mod n): result of modular exponent operation
Algorithm

```
a101    v=a;
a102    for(i=u−2;i>=0;i=i−1) {  /* extract top k-bit of d */
a103      v = v × v (mod n);
a104      if (d_i == 1) v = v × a (mod n);
a105    }
a106    return v;
```

In algorithm 1, v is initialized, i.e., v=a in step a101, the first step, and the u-bit value $d=(d_{u-1}, d_{u-2}, \ldots, d_0)_2$ is searched for in the order of $d_{u-1}, d_{u-2}, \ldots d_0$. The expression $(\ )_2$ represents a binary number, for example, $(101)_2=5$, $(1101)_2=13$. Also, $d_{u-1}=1$ is satisfied.

This search is repeated in the "for loop" over steps a102 through a105. In the for loop, the calculation process of v=v×v (mod n) is executed in step a103, and processes are switched according to bit value $d_i$ in step a104. When $d_i=0$, no process is performed, and when $d_i=1$, the operation of v=v×a (mod n) is performed. In other words, when $d_i=0$, a squaring is executed, and when $d_i=1$, a squaring and multiplication are executed. This is repeated for each of $d_{u-1}, d_{u-2}, \ldots, d_0$ in order to perform an modular exponent operation process. In step a106, v is output as a calculation result.

FIG. 1 schematically illustrates the flow of the process in algorithm 1.

A binary method is used not only in RSA cryptography, but also in a process called a point scalar multiplication in ECC. Point scalar multiplication is a process of calculating a point V that satisfies V=dA where d represents a scalar value, and A represents point A on an elliptic curve. Algorithm 2 is described below as an algorithm for performing point scalar multiplication V=dA using a binary method.

<Algorithm 2: Scalar Multiplication Using Binary Method>

Input
d: exponent
u: bit number of d
A: point on elliptic curve

Output

V=dA: d multiplication of A

Algorithm

| | | |
|---|---|---|
| a201 | V=A; | |
| a202 | for(i=u−2;i>=0;i=i−1) { | |
| a203 | V=2V; | |
| a204 | if (d$_i$==1) V=V+A; | |
| a205 | } | |
| a206 | return V; | |

In algorithm 2, similarly to algorithm 1, V is initialized, i.e., V=A in step s201, and in step a202, a u-bit value d=(d$_{u-1}$, d$_{u-2}$, ... d$_0$)$_2$ is searched for in the order of d$_{u-1}$, d$_{u-2}$, ..., d$_0$ in the for loop when d$_{u-1}$=1. In the for loop, the calculation process of V=2V is performed in step a203, and then the process proceeds to step a204 where no process is executed when the bit value d$_i$=0 (only point doubling is executed) and the process of V=V+A is executed when d$_i$=1 (point doubling and point addition are executed). This is repeated for each of d$_{u-1}$, d$_{u-2}$, ..., d$_0$ so as to execute a process of point scalar multiplication. In a206, the last step, V is output as a calculation result.

[b. Montgomery Multiplication Remainder]

As another algorithm for processing the above algorithm effectively, a method named the Montgomery multiplication remainder (operation) is known (see Non-Patent Document 3 for more detailed information).

The Montgomery multiplication remainder is an algorithm for performing, at high speed, a multiplication remainder operation expressed by s×t (mod N) where s, t, and n represent integers. The use of the Montgomery multiplication remainder enables the calculation of REDC(A, B, N)=s×t×r$^{-1}$ (mod n) where r=2$^f$ is satisfied, s and t represent f-bit integers, and n represents an f-bit odd number (0≦s×t≦r×n). In the above expression, r$^{-1}$(mod n) represents the inverse of r of the modulus n, and satisfies r×r$^{-1}$=1 (mod n).

The use of this algorithm enables the execution, at high speed, of the processes of a squaring (v=v×v (mod n)) multiplication (v=v×a (mod n)), point doubling (V=2V), and point addition (V=V+A) in algorithms 1 and 2 above so that the entire calculation of algorithms 1 and 2 can be executed effectively.

A basic algorithm of the Montgomery multiplication remainder is described below as algorithm 3.

<Algorithm 3: Basic Algorithm of Montgomery Multiplication Remainder>

Input s: f-bit integer t: f-bit integer n: modulus of remainder, f-bit odd value Output v=s×t×r$^{-1}$(mod n): result of Montgomery multiplication remainder (r=2$^f$)

Algorithm

| | |
|---|---|
| a301 | n'=(−n$^{-1}$) (mod 2$^f$); |
| a302 | h=s×t×n' (mod 2$^f$); |
| a303 | u=((s×t)+(h×n))/2$^f$; /* the lower f bits of (s×t)+(h×n) are all zero */ |
| a304 | if (u≧n) u=u−n; |
| a305 | return u; |

To this algorithm 3, s, t, and n are input to calculate an n' that satisfies n'=−n$^{-1}$ (mod 2$^f$) in step a301, and an h that satisfies h=s×t×n'(mod 2$^f$) is calculated in step a302. In step a303, the above h, s, t, and n are used to calculate u=((s×t)+(h×n))/2$^f$. It is mathematically proven that (s×t)+(h×n) in that calculation is always a multiple of 2$^f$ (in other words, the lower f bits are all zero), and therefore it is assured that the result u of the division in step a303 is always an integer (see the calculation example presented below). In step a304, u and n are compared in magnitude, and the calculation of u=u−n is performed when u is equal to or greater than n. In step a305, u is output as a calculation result.

Below is a calculation example of algorithm 3. Note that numbers starting with "0x" are values expressed in hexadecimal.

When s = 0x1234, t = 0x5678, n = 0xffff, and f =16

| | |
|---|---|
| a301 | n'=(−n$^{-1}$) (mod 2$^{16}$) = 0x0001 |
| a302 | h=s×t×n' (mod 2$^{16}$) = (0x1234)×(0x5678)×(0x0001) (mod 2$^{16}$) = 0x0060 |
| a303 | u=((s×t)+(h×n))/2$^{16}$ = (0x06260060 + 0x005fffa0)/2$^{16}$ = 0x06860000/2$^{16}$ = 0x0686 /* the lower f bits of (s×t)+(h×n) in a303 are all zero*/ |
| a304 | as the condition u≧n is not met, calculation u = u−n is not performed |
| a305 | return 0x0686 |

In the Montgomery modular multiplication in algorithm 3, an f-bit variable is used for the multiplication. However, in calculations for cryptography, the value of f usually tends to be so great as to exceed the bit width that can be calculated using commonly used multipliers. For example, the maximum bit width that can be calculated by commonly used multipliers is 64 bits×64 bits while f is 1024 in RSA cryptography and f is 160 in ECC. Accordingly, algorithm 3 above cannot be executed directly by commonly used hardware, which is problematic.

In order to solve this problem, an algorithm for making algorithm 3 be executable on a multiplier of w-bit by w-bit (w<f) is used. There are various types of implementation algorithms for the Montgomery modular multiplication, and an example thereof is presented below as algorithm 4.

<Algorithm 4: Example of Implementation Algorithm of Montgomery Modular Multiplication>

Input s: f-bit integer t: f-bit integer r: r=2$^f$ n: modulus of multiplication remainder, f-bit odd value Output REDC(s,t)=s×t×r$^{-1}$(mod n)

Multi-Precision Integers s=(s$_{g-1}$, ..., s$_0$)

t=(t$_{g-1}$, ..., t$_0$)

n=(n$_{g-1}$, ..., n$_0$)

y=(y$_g$, ..., y$_0$)

n'=(n'$_{g-1}$, ..., n'$_0$)

W-Bit Word Data, where r=2$^w$.

tmp, c$_1$, c$_2$, h'

Algorithm

| | |
|---|---|
| a401 | y = 0; |
| a402 | for (j=0;j<=g−1;j=j+1) { |
| a403 | (c$_1$, tmp) = y$_0$ + s$_0$ × t$_j$; |
| a404 | h' = tmp × n'$_0$ (mod 2$^w$); |
| a405 | (c$_2$, y$_{NULL}$) = tmp + h'×n$_0$ /* y$_{NULL}$ is always zero */ |
| a406 | for (i=1;i<=g−1;i=i+1) { |
| a407 | (c$_1$, tmp) = y$_i$ + c$_1$ + s$_i$ × t$_j$; |

-continued

| | |
|---|---|
| a408 | $(c_2, y_{i-1})$ = tmp + $c_2$ + h' × $n_i$; |
| a409 | } |
| a410 | $(c_2, c_1) = C_1 + C_2 + y_g$; |
| a411 | $y_{g-1} = C_1$; |
| a412 | $y_g = C_2$; |
| a413 | } |
| a414 | if (y>=n) y=y-n; |
| a415 | return y; |

In algorithm 3, the data of an f-bit integer is expressed using a plurality of w-bit variables. For example, an f-bit variable s is expressed using g w-bit variables $s_i$ (i=0, 1 . . . g-1) (the smaller i is, the lower the bit of the value is) such as in s=($s_{g-1}, s_{g-2}, \ldots, s_0$). However, w×g≧f is satisfied. Integer data expressed using plural w-bit variables such as above is called a multiple-precision integer. For a multiple-precision integer, data is expressed on a w-bit basis, and the data value of w bits is referred to as "a 1 word".

As algorithm 4, an example of an implementation algorithm is illustrated as an example that enables the calculation of algorithm 3 by dividing data in units of 1 word and combining the multiplication of w-bit×w-bit.

In order to calculate the sum of the results of the multiplication of f-bit×f-bit, i.e., (s×t)+(h×n), algorithm 4 consists of: (1) the loop of a402 through a413 (j=0, 1, . . . , g-1) for calculating the sum of the multiplication of f-bit×w-bit, i.e., (s×$t_j$)+(n×$h_j$); and (2) the loop of a406 through 409 for performing the multiplication of this f-bit×w-bit by accumulating the results of the multiplication of w-bit×w-bit.

The lower f bits of (s×t)+(h×n) calculated in a303 in algorithm 3 are all zero, and therefore, it is mathematically assured that the lower w bits of (s×$t_j$)+(n×$h_j$) calculated in algorithm 4 are all zero too. In algorithm 4, a value obtained by dividing (s×$t_j$)+(n×$h_j$) by $2^l$ is stored in y=($y_g, \ldots, y_l, y_0$) (the division by $2^l$ is performed by the shift in steps a407 and a408), and the values of the lower w bits that are always all zero are stored in $Y_{NULL}$ in step a405.

[c. RSA Cryptography with CRT]

An algorithm called Chinese Remainder Theorem (CRT) is known as an operation method for performing, at high speed, a decryption process in RSA cryptography. CRT algorithm is a method for accelerating a decryption process m=$c^d$ (mod n) in RSA. The use of a CRT algorithm can accelerate a decryption process in RSA by four times, and thus it is used very often.

A decryption process in RSA using a CRT algorithm is described below as algorithm 5.

<Algorithm 5: Decryption Process in RSA Using a CRT Algorithm> input: c, $d_p$(=d mod(p-1)) $d_q$(=d mod(q-1)), p, q, u(=$p^{-1}$ (mod q))

output: m (=$c^d$ mod n)

Algorithm

| | |
|---|---|
| a501 | $c_p$ = c (mod p) , $c_q$ = c mod q |
| a502 | $m_p = c_p^{dp}$ (mod p) |
| a503 | $m_q = c_q^{dq}$ (mod q) |
| a504 | m = (($m_q - m_p$) × u (mod q) ) × p + $m_p$ |
| a505 | return m |

The reason that a CRT algorithm can accelerate the process will be explained. In RSA cryptography, a modulus n is expressed as n=p×q where p and q are prime numbers, while in a CRT algorithm, the modular exponent operations are performed on moduli p and q instead of a modulus n. The respective bit lengths of p and q are each half the bit length of n, and reduction of the bit length to half reduces the calculation amount of one exponent remainder operation to ⅛ (in an exponent remainder operation, a cube of a bit length is calculated, and the calculation amount is reduced to ⅛, as $(½)^3=⅛$). An exponent remainder operation in which the bit length is reduced to half has to be executed two times, i.e., one time each for a modulus p and modulus q. Therefore, the total amount is 2×(⅛)=¼, which means four times faster.

[d. Fault Attack]

A fault attack is, as was already described, a method made public by Boneh, DeMillo, and Lipton in 1997, by which various stresses (such as abnormal clocks, excessive voltage, high temperature or the like) are applied to the circuit of the cryptographic processor in an embedded device for a smart card or the like so that the internal data in the circuit involves abnormal values in order to decipher the key information in the cryptographic processor.

FIG. 2 illustrates widely distributed procedures for fault attacks.

First in step S201, an attacker inputs data into a smart card to start the cryptographic process. In step S202, the attacker applies stress to the circuit of the cryptographic processor that is executing the cryptographic process in order to make an abnormal value occur in the internal data (occurrence of fault). In step S203, the attacker obtains the abnormal data value output as the result of the cryptographic process. The abnormal value thus obtained is used for an analysis calculation so that the attacker can decipher the value of the secret key.

Fault attack is effective on all types of smart cards that have a public-key cryptography function. Particularly, a fault attack on a CRT algorithm is known as a great threat because it is easy for attackers to implement this attack.

A procedure for making an attack using a CRT algorithm is illustrated below as Algorithm 6. Note that GCD (a, b) represents the greatest common divider of a and b. For example, GCD (10, 25)=5.

<Algorithm 6: Fault Attack Using CRT Algorithm> a601: attacker gives an encrypted text c to a smart card to execute a CRT algorithm process without making a fault occur, so that he or she can obtain a normal decryption result m. It is to be noted that $d_p$, $d_q$, p, q, u are not values input from the external environment but are secret keys stored in the card.

a602: attacker gives an encrypted text c to the smart card to execute a CRT algorithm to make a fault occur in order to obtain an abnormal decryption result m'. At this moment, it is obvious that m'≠m.

a603: attacker calculates GCD (m-m', n) to obtain a prime number p=GCD(m-m', n). It is known that all the secret keys $d_p$, $d_q$, p, q, u can be easily calculated from this prime number p. Thus, the attacker can decipher all the secret keys.

The occurrence of a fault in a602 will be illustrated in FIG. 3 in detail. In this explanation, the step numbers used in algorithm 5 above are used.

First, in the process in step a503, the attacker makes a fault occur so as to cause an abnormal value as a result of an exponent remainder operation of the modulus q. In other words, an abnormal value $m_q' \neq c_q^{dq}$(mod q) is obtained instead of a normal value $m_q = c_q^{dq}$ (mod q).

As the calculation result in step a503 is an abnormal value, the value calculated in step S504 is also an abnormal value m'≠$c^d$ (mod n). Thereby, this abnormal value m' is output in step a505.

In a fault attack as widely practiced, only limited data can make a fault occur (for example, the third bit value in the data has to be inverted, etc.), and also a fault has to be made to occur 50 through 200 times repeatedly. By contrast, in a fault attack on a CRT algorithm, there is no limitation on data in making a fault occur in step a503, and any bit value may be inverted as long as m'$_q \neq$m$_q$ is satisfied. Further, a single success in making a fault occur enables the deciphering of secret keys.

Thus, it is known that a fault attack on a CRT algorithm is easy for attackers to implement, and it is a great threat to smart card.

[e. Conventional Countermeasure Against Fault Attack]

A method called fault detection is known as a countermeasure against the above described fault attack. This is a method in which whether or not a calculation result of a CRT algorithm is an abnormal value is detected in a smart card. In this method, data as a calculation result is not output when it is detected in a smart card that the calculation result of a CRT algorithm is an abnormal value m'. Thereby, the implementation of a procedure for attacking in step a602 becomes impossible and thus fault attacks can be prevented.

Doubling of a CRT algorithm is known as a common method of performing fault detection. The outline of an algorithm for performing this method is described below as algorithm 7.

<Algorithm 7: Fault Detection by Doubling of CRT Algorithm> a701: calculate m$_1$ from c, d$_p$, d$_q$, p, q, u by CRT algorithm
a702: calculate m$_2$ from c, d$_p$, d$_q$, p, q, u by CRT algorithm
a703: when m$_1 \neq$m$_2$, fault is determined to have occurred, and when m$_1$=m$_2$, fault is determined to have not occurred.

As described above, a calculation by a CRT algorithm is performed twice, and a fault is determined to have occurred when the results of the calculations are different from each other, while a fault is determined to have not occurred when the results are identical.

[Problem with Conventional Countermeasure Against Fault Attack]

The fault detection method described as algorithm 7 executes the detection of the occurrence of a fault only in step a703. In other words, a fault cannot be detected at the moment when it occurs, and the fault remains undetected until a703, the last step.

This means that in a smart card that cannot detect the occurrence of a fault because it uses algorithm 7, a particular procedure can lead to success in a fault attack, which is problematic. FIG. 4 illustrates this problem in the fault detection method in algorithm 7. Phase numbers such as 1, 2, and 3 used in the RSA computations in FIG. 4 correspond to steps a501, a502, a503, and a504 in algorithm 5, respectively.

As has already been explained, the detection method in algorithm 7 executes the computations of RSA twice, and compares the computation results m$_1$ and m$_2$ in order to determine whether or not a fault has occurred. This detection method is capable of detecting the occurrence of a fault when the attack makes a fault occur only once. However, it is not capable of detecting a fault attack that makes a fault occur twice under the same conditions. This is because m$_1$'=m$_2$' is satisfied despite the fact that m$_1$ and m$_2$ are both abnormal values, and accordingly the occurrence of a fault cannot be detected in the latter case while either m$_1$ or m$_2$ is an abnormal value (m1' or m2') to satisfy m$_1 \neq$m$_2$ or m$_1 \neq$m$_2$' in the former case.

Therefore, the conventional fault detection method using the doubling of a CRT algorithm involves a problem wherein it fails to detect a fault at the moment the fault has occurred.

Those who have a technique of attacking can easily make the same fault occur plural times, and thus this conventional method is greatly problematic in view of security.

Non-Patent Document 1:
D. Boneh, R. A. DeMillo, and R. J. Lipton., "On the importance of checking cryptographic protocols for faults," In W. Fumy, editor, Advances in Cryptology—EUROCRYPT '97, volume 1233 of Lecture Notes in Computer Science, pages 37-51, Springer-Verlag, 1997.

Non-Patent Document 2:
Ingrid Biehl, Bernd Meyer and Volker Muller, "Differential Fault Attacks on Elliptic Curve Cryptosystems," Advances in Cryptology-CRYPT 2000, volume 1880 of Lecture Notes in Computer Science, pages 131-146, Springer-Verlag, 2000.

Non-Patent Document 3:
S. R. Dusse and B. S. Kaliski Jr., "A Cryptographic Library for the Motorola DSP56000," Advances in Cryptology—EUROCRYPTO '90 (LNCS 473), pages 230-244, 1990.

Non-Patent Document 4:
Mukaida, Takenaka, Masui, Torii, "Designing of High-speed Montgomery Multiply-accumulation remainder circuit" issued in symposium on cryptography and information security, SCIS2004, 2A3-2

DISCLOSURE OF THE INVENTION

The present invention relates to an implementation technique for taking a countermeasure against fault attack that targets a cryptographic processor performing public-key cryptography. The use of this technique can make it difficult to crack secret keys in a public-key cryptography process such as RSA, and can enhance the security of embedded devices such as a smart card and the like.

The present invention provides a cryptographic processing device comprising: a storage unit; initial setting unit for setting a value to be stored in the storage unit; Montgomery modular multiplication operation unit for performing a Montgomery modular multiplication operation plural times for a value set by the initial setting unit; and fault attack detection unit for determining whether or not a fault attack occurred for each of at least some parts of the Montgomery modular multiplication operations performed plural times.

Preferably, the initial setting unit sets f-bit values s, t, n, and h and a w-bit value n' to store them in the storage unit (where f and w are natural numbers).

Preferably, the Montgomery modular multiplication operation is y=REDC(s, t, n)=s×t×2$^{-f}$ (mod n) (where y is an f-bit value).

Preferably, the fault attack detection unit determines that a fault attack occurred when a digit in the lower f bits of the value of s×t+h×n calculated by the Montgomery modular multiplication operation unit involves a value that is not zero, and values in the mathematical expressions satisfy h=s×t×n' (mod 2$^f$) and n'=−n$^{-1}$ (mod 2$^f$).

The present invention also provides a smart card including the above cryptographic processing device (such as an IC card).

The present invention also discloses a cryptographic processing method comprising: setting f-bit values s, t, n, and h and a w-bit value n' (where f and w are natural numbers); calculating f-bit value y satisfying a Montgomery multiplication remainder operation y=REDC(s, t, n)=s×t×2$^{-f}$ (mod n) for a value set by the initial setting unit; and detecting a fault attack by determining that a fault attack occurred when a digit in the lower f bits of the value of s×t+h×n calculated by the Montgomery multiplication remainder operation unit includes a value that is not zero, wherein: values in the mathematical expressions satisfy h=s×t×n' (mod 2$^f$) and n'=−n$^{-1}$ (mod 2$^f$).

Further, the present invention provides a program for causing a computer to execute the above method.

The use of the present invention enables the detection of an attack by which faults are made to occur plural times that could not be prevented by the conventional methods, and thereby the present invention can enhance the security of cryptographic processing devices.

BRIEF DESCRIPTION OF THE DRAWINGS

FIG. 5 schematically illustrates a difference between a conventional fault attack detection method and a fault attack detection method according to the present invention;

FIG. 13 illustrates a hardware configuration that can execute the program according to the present invention.

DESCRIPTION OF EMBODIMENT(S)

[Definition]

Figure 1:
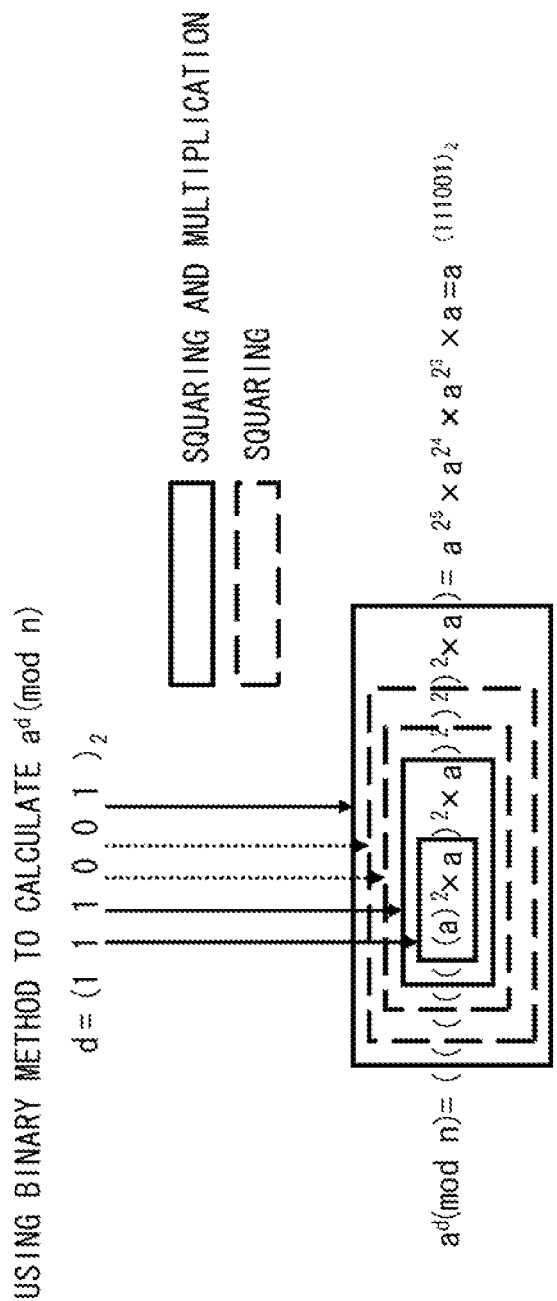
FIG. 1 illustrates an example of a conventional exponent remainder operation using a binary method.
Figure 2:
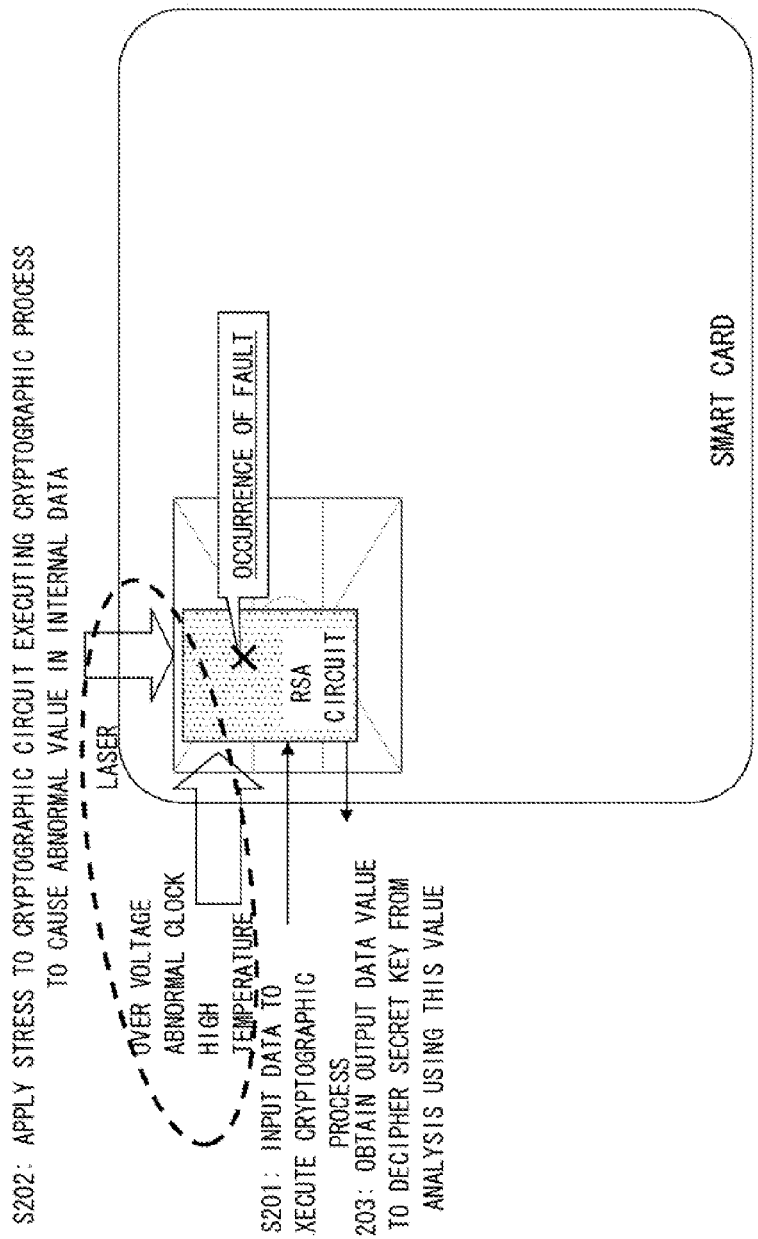
FIG. 2 illustrates a conventional and common procedure in a fault attack.
Figure 3:
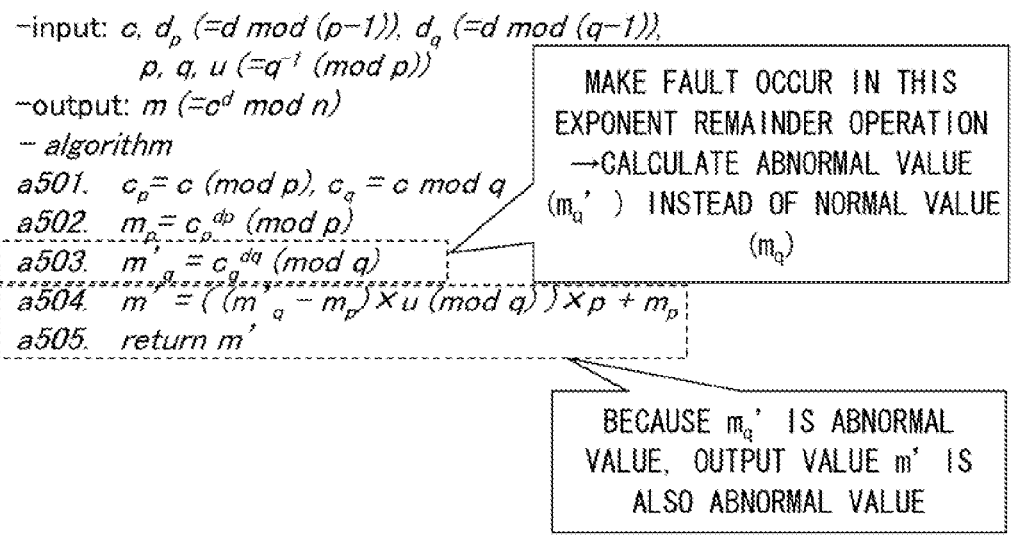
FIG. 3 illustrates an example of a fault attack using a CRT algorithm according to a conventional technique.
Figure 4:
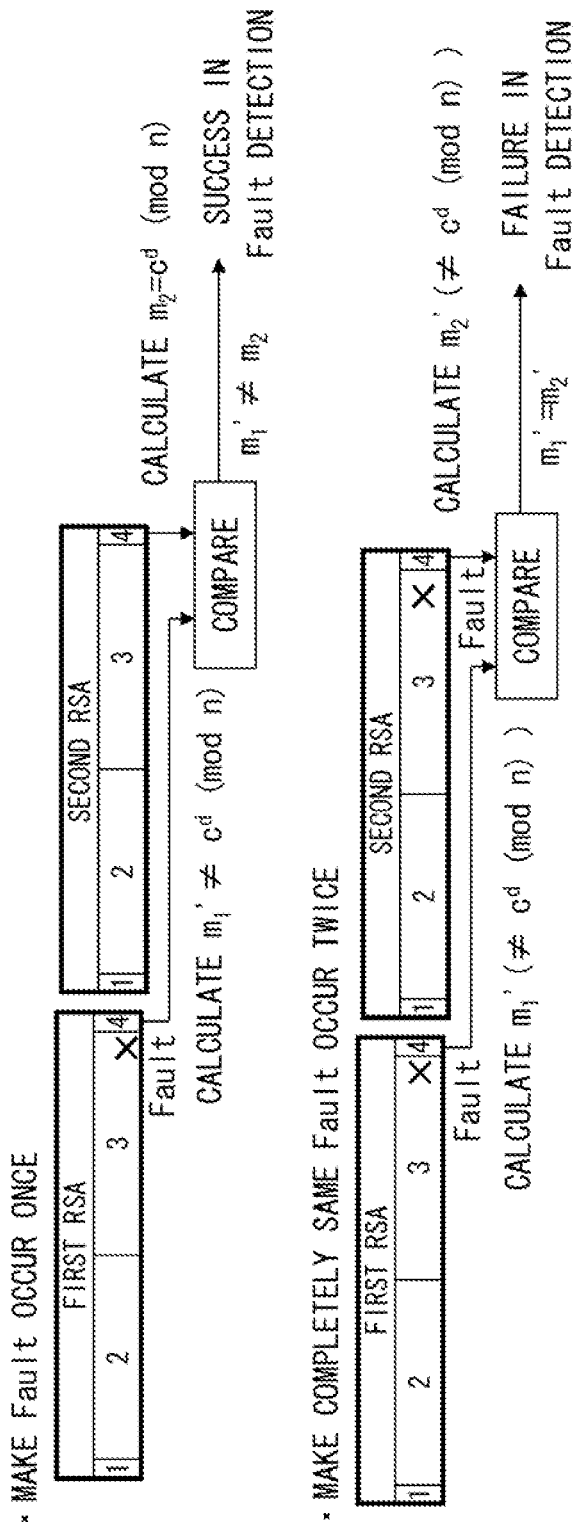
FIG. 4 illustrates a problem in a conventional countermeasure against a fault attack.

The word "algorithm" used herein is intended to mean a procedure that is described in such a manner that the purpose and result thereof can be understood by those skilled in the art. Those skilled in the art can execute the algorithms described herein by implementing them on appropriate equipment and using appropriate formats and means.

The word "multiply-addition-addition (operation)" is intended to mean an operation such as a×b+c+d, that is, an operation in which addition is performed to the result of multiplication and addition.

Hereinafter, embodiments of the present invention will be explained by referring to the drawings without intending to limit the scope of the present invention. Also, cases of using RSA cryptography are described as examples in the embodiments described below; however, the scope of the present invention is not limited to such examples, and those skilled in the art can apply the present invention to any apparatus that uses any type of public key cryptography using a Montgomery modular multiplication. For example, the present invention can be applied to ECC as well.

[Basic Configuration]

FIG. 5 schematically illustrates the difference between the conventional fault attack detection method (described as algorithm 7) and the fault attack detection method according to the present invention. In FIG. 5, the difference is explained by using an example of the operation of decrypting information that was RSA encrypted. In an RSA process, a Montgomery modular multiplication operation is repeated thousands of times, and the detection frequency can be raised greatly by detecting faults each time a Montgomery modular multiplication operation is performed.

As described above, a conventional fault detection method using the doubling of a CRT algorithm can be immobilized by an attack by which a fault is made to occur twice under the same condition.

By contrast, the fault attack detection method according to the present invention can detect a fault attack each time a Montgomery multiplication remainder operation is performed in order to enable detection at the earliest possible moment. Further, the present method does not require an RSA operation to be performed twice, and can be implemented at a lower cost for calculation than that of algorithm 7.

Further, the fault attack detection method according to the present invention can be used together with the doubling of a CRT algorithm 1, if desired.

When the occurrence of a fault attack is detected, the cryptographic function can be suspended so as to prevent the attacker from stealing the information.

Figure 6:
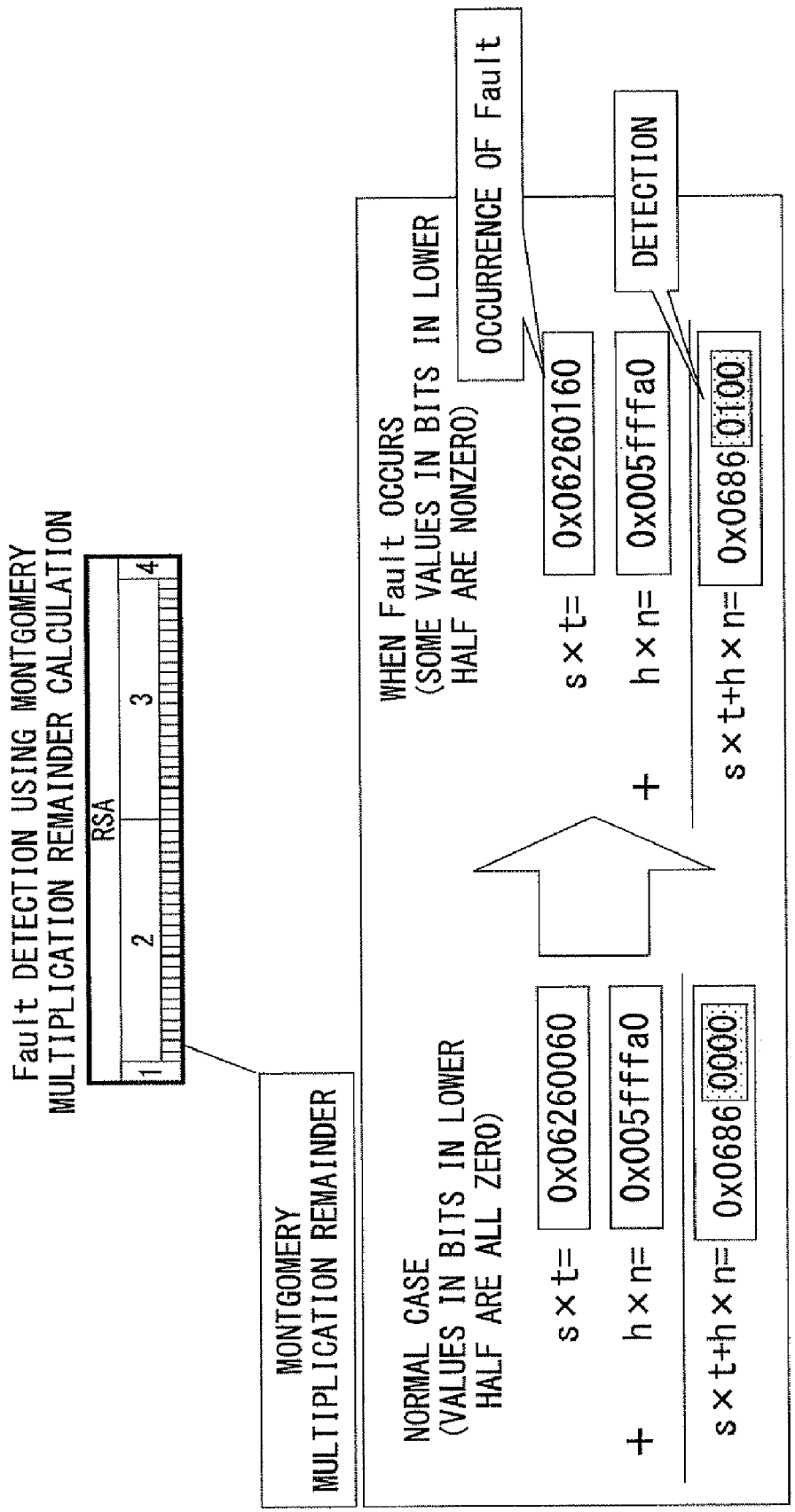
FIG. 6 schematically illustrates the principle of a fault detection method using a Montgomery multiplication remainder operation according to the first embodiment of the present invention.

FIG. 6 illustrates the principle of the fault detection method using a Montgomery modular multiplication operation according to the present invention. In FIG. 6 as well, an operation of decrypting information that was RSA encrypted is given as an example.

Phase numbers such as 1, 2, and 3 used in the RSA computations in FIG. 6 correspond to steps a501, a502, a503, and a504 in algorithm 5, respectively. As was already described, phases 2 and 3 in RSA include plural Montgomery modular multiplication operations (in FIG. 6, phases 2 and 3 are divided into segments, and these segments express individual Montgomery modular multiplication operations).

In FIG. 6, an example is described in which (s×t)+(h×n) is calculated in one of the Montgomery multiplication remainder operations in phase 2. When this calculation is performed normally, the calculated value will have zero as the values (in hexadecimal in this example) in all of the bits in the lower half. When a fault attack is made during this single Montgomery modular multiplication operation, the order of the bit values is broken so that a number that is not zero is included among the bit values in the bits in the lower half, as illustrated in FIG. 6. As described above, according to an embodiment of the present invention, a fault attack can be detected each time one of plural Montgomery modular multiplication is performed.

Common circuits for performing a Montgomery modular multiplication are designed to ignore variable data having bits that are all zero. However, fault detection according to the present invention employs a simple method in which it is determined whether or not those data values to be ignored are all zero, and can implement the detection of faults at very low cost.

Embodiment 1

Using Dynamic h'

The first embodiment of a fault detection algorithm according to the present invention will be described below as algorithm 8.

<Algorithm 8: Implementation Algorithm of Montgomery Modular Multiplication Including Fault Detection Part>

Input
s: f-bit integer
t: f-bit integer
r: $r=2^f$
n: modulus of remainder, f-bit odd value Output
$REDC(s,t)=s \times t \times r^{-1} \pmod{n}$ Multi-Precision Integers
$s=(s_{g-1}, \ldots, s_0)$
$t=(t_{g-1}, \ldots, t_0)$
$n=(n_{g-1}, \ldots, n_0)$
$y=(y_g, \ldots, y_0)$
$n'=(n'_{g-1}, \ldots, n'_0)$ W-Bit Word Data, where $r=2^w$.
tmp, $c_1$, $c_2$, h'

Algorithm

```
a801  y = 0;
a802  for (j=0;j<=g-1;j=j+1) {
a803     (c_1, tmp) = y_0 + s_0 × t_j;
a804     h' = tmp × n'_0 (mod 2^w);
a805     (c_2, y_NULL) = tmp + h' × n_0 /* y_NULL is always zero when it is normal */
a806     if (y_NULL != 0) return FAULT /* fault is detected to terminate algorithm */
a807     for (i=1;i<=g-1;i=i+1) {
a808        (c_1, tmp) = y_i + c_1 + s_i × t_j;
a809        (c_2, y_{i-1}) := tmp + c_2 + h' × n_i;
a810     }
a811     (c_2, c_1) = C_1 + C_2 + y_g;
a812     y_{g-1} = C_1;
a813     y_g = C_2;
a814  }
a815  if (y>=n) y = y-n;
a816  return y;
```

This algorithm 8 is an algorithm obtained when fault detection according to the present invention (corresponding to step a806) is applied to the Montgomery modular multiplication algorithm described in algorithm 4.

In a normal state, i.e., when a fault has not occurred, the value of $Y_{NULL}$ calculated in step a805 is always zero. Accordingly, it is checked in step a806 whether a fault occurred in the calculations in steps a803 and a804, and a fault is determined to have occurred when $Y_{NULL}$ is not zero so that an error value "FAULT" is output in order to report the occurrence of a fault, and the algorithm is terminated.

Embodiment 1-1

Basic Circuit for Algorithm 8

Figure 7:
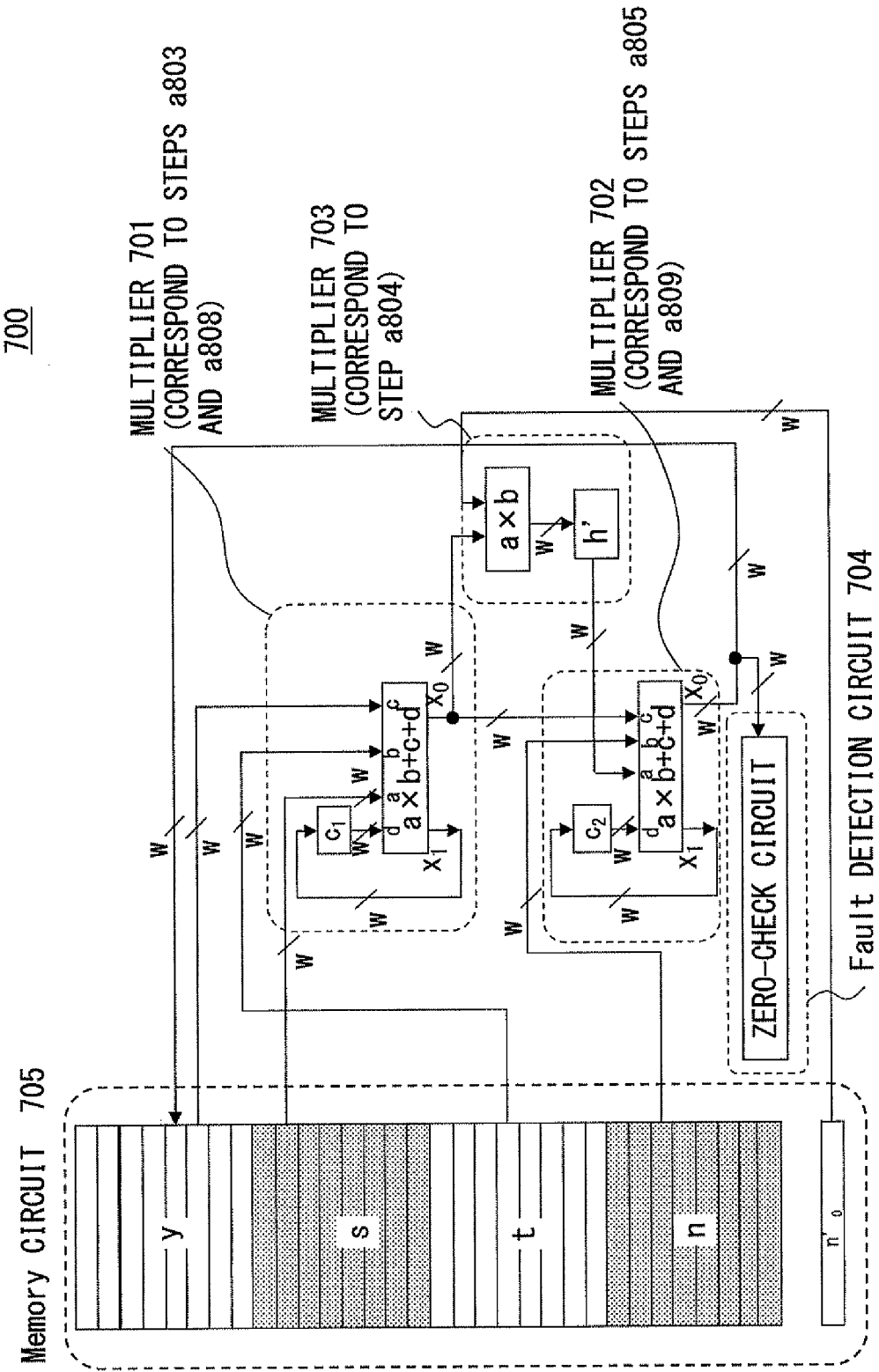
FIG. 7 illustrates a configuration of a circuit 700 that can implement the fault detection method according to the first embodiment of the present invention.

FIG. 7 illustrates an example of implementing algorithm 8 in the form of a circuit. A circuit 700 in FIG. 7 includes multipliers 701 through 703, a fault detection circuit 704, and a memory circuit 705. The memory circuit 705 stores input/output data s, t, y, n, and n'$_0$. The slash marks and letters put to the arrows for indicating the flow of data represent the number of bits of the data. This also applies to the circuit diagrams appearing hereinafter.

The multiplier 701 is a circuit for performing the multiply-addition-addition operations in steps a803 and a808 in algorithm 8. The multiplier 702 performs the multiply-addition-addition operations in steps a805 and a809 in algorithm 8. The multiplier 703 performs the integration in a804.

The fault detection circuit 704 is a circuit performing the fault detection in step a806, and it determines whether or not the values of the lower w bits of the result of the multiply-accumulation-accumulation performed by the multiplier 703 are zero.

Embodiment 1-2

Circuit for Algorithm 8 Including Buffer Configuration

The configuration of the circuit 700 described above is based on the multiply-addition-addition of w-bit×w-bit. This circuit configuration causes a problem of memory bandwidth.

The circuit 700 executes a process of reading (reading process) 5 pieces of w-bit data (s, t, y, n, and n'$_0$) and a process of writing (writing process) one piece of w-bit data (y). In other words, the maximum data amount in the memory circuits being accessed in one cycle is 5w bits and w bits for a reading process and writing process, respectively. It is generally known that the greater the data amount accessed in one cycle in a memory circuit, the higher the cost of the memory circuit. A circuit configuration based on the multiply-accumulation-accumulation of 2w-bit×w/2-bit is known as a configuration of a Montgomery modular multiplication circuit that solves the problem of access bandwidth (See Non-Patent Document 4 for detailed information).

An embodiment of the present invention can also be implemented by using the above circuit configuration with reduced memory bandwidth.

Figure 8:
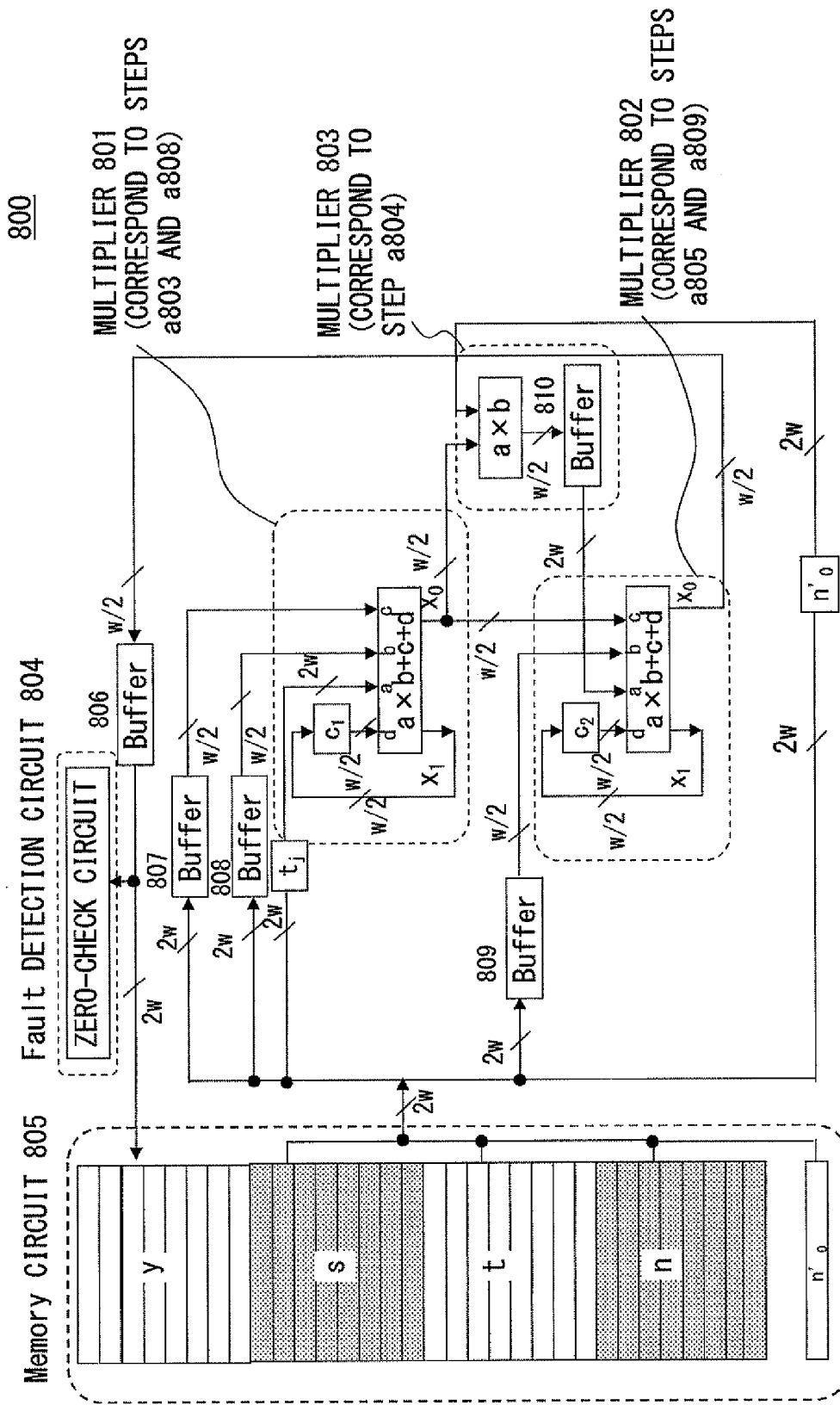
FIG. 8 illustrates a configuration of a circuit 800 that can implement the fault detection method according to the first embodiment of the present invention and to which a memory bandwidth reduction technique is applied.

FIG. 8 illustrates a configuration of a circuit 800 in which the circuit 700 is used as its fundamental element and the above described technique of reducing memory bandwidth is used. The circuit 800 includes a multiplier 801 for performing the multiply-addition-addition operations in steps a803 and a808 in algorithm 8, a multiplier 802 for performing the multiply-accumulation-accumulation operations in steps a805 and a809, a multiplier 803 for performing the integration in step a804, a fault detection circuit 804, a memory circuit 805 for storing input/output data s, t, y, n, and n'$_0$, and buffer circuits 806 through 811.

The circuit 800 is different from the circuit 700 in that it uses a multiplier of 2w-bit×w/2-bit and in the effects of the buffer circuits 806 through 810. The circuit 700 involves a problem in that the data amounts accessed in one cycle vary between cycles. Meanwhile, the circuit 800 has buffer circuits to temporarily store data read from memory. Thereby, data amounts in memory accessed in one cycle can be smoothed (averaged) between cycles so that the memory bandwidth can be optimized.

In the Montgomery multiplication remainder operation y=s×t+h×n, the variables y, t, and n are accessed the most frequently as described in algorithm 8. Thus, the buffer circuits 807 through 809 are used to smooth the data amounts of y, s, and n when these pieces of data are read from memory. Data of 2w bits is input into the buffer circuits 807 through 809, and data of w/2 bits is output from the buffer circuits 807 through 809. In other words, each of the buffers can hold 4 pieces of data of w/2 bits when it has received data of 2w bits, and thus it does not have to perform a process of reading data y, s, and n for each cycle, and one reading process for four cycles is enough. This means that the respective pieces of data y, s, and n can be read sequentially in units of 2w bits during four cycles, and the bandwidth required for reading can be reduced.

Also, the buffer 806 is used for writing data. Data of w/2 bits is input into the buffer circuit 806, and data of 2w bits is output from the buffer circuit 806. This means that the buffer circuit 806 can hold four pieces of data of w/2 bits, and one writing process during four cycles is enough.

By reading y, s, and n in units of 2w bits and handling them in units of w/2 bits, memory bandwidth can be reduced; however, when bit length is reduced to half without any compensation, the speed of processing the Montgomery modular multiplication is also reduced. In order to avoid this problem, t and h are read in units of 2w bits so as to handle them as data of 2w bits so that processing is performed using a multiplier of 2w-bit×w/2-bit as the basic unit. This is why the present embodiment includes buffer circuits 810 and 811 for receiving the output from the multiplier 803. Data of pieces of data of w/2 bits are input into the buffer circuits 810 and 811, and thereafter pieces of data of 2w bits are input into the multipliers 802 and 801, respectively.

As described in algorithm 8, data t and h are accessed less frequently than data y, t, or n, and accordingly reading these pieces of data in units of 2w bits does not impose a burden on the memory bandwidth. Also, the use of a multiplier of 2w-bit×w/2-bit can attain a processing speed that is almost as high as the speed attained by the use of a multiplier of w-bit× w-bit. In other words, memory bandwidth can be reduced without deteriorating the performance.

In the configuration of the circuit 700, the maximum data amounts accessed in one cycle are 5w bits and w bits respectively for a reading process and a writing process, whereas the data amounts accessed in one cycle are reduced to 2w bits both for reading and writing processes in the configuration of the circuit 800.

The fault detection circuit 804 in the circuit 800 does not check data output from the multiplier 802 but checks a 2w-bit value output from the buffer 806 buffering that data output from the multiplier 802, and determines whether the checked value includes a value that is not zero in order to detect a fault. This is because h is handled as a 2w-bit input in the multiplication of 2w-bit×w/2-bit so that 2w-bit values output from the buffer circuit 806 are all zero under normal conditions, i.e., when a fault has not occurred.

Although multipliers of 2w-bit×w/2-bit and the configurations of buffers for them have been used as examples in the above embodiments 1 and 2, the scope of the present invention is not limited to them, and a circuit using a multiplier of (k*w)-bit×(w/k)-bit where k is an arbitrary natural number considered appropriate by those skilled in the art and a buffer for that multiplier can be implemented.

Embodiment 2

When h' that has been Calculated Beforehand is Used

Besides algorithm 4, various other algorithms for performing Montgomery multiplication remainder operations are known. Algorithm 8 above can detect a fault by the calculations in steps a803 and 804, but cannot detect the occurrence of a fault in and after step a807. This is because the value of h' is updated dynamically in response to the internal variable as described in step a804.

Thus, by changing the method of calculating h', the above problem can be solved. A Montgomery multiplication remainder algorithm in which a condition of detecting a fault has been changed will be described as algorithm 9.

<Algorithm 9: Implementation Algorithm of Montgomery Multiplication Remainder in which a Condition of Detecting a Fault has been Changed (h' is Calculated Beforehand)>
Input
s: f-bit integer
t: f-bit integer
R: $R=2^f$
N: modulus of remainder, f-bit odd value
   Output
$REDC(A,B)=A\times B\times R^{-1}(\mod N)$
   Multi-Precision Integers
$s=(s_{g-1}, \ldots, s_0)$
$t=(t_{g-1}, \ldots, t_0)$
$n=(n_{g-1}, \ldots, n_0)$
$h=(h_{g-1}, \ldots, h_0)$, where $h=s\times t\times n'(\mod R)$
$y=(y_g, \ldots, y_0)$
   W-Bit Word Data, where $r=2^w$.
tmp, $c_1$, $c_2$, h
   Algorithm

```
a901   y = 0;
a902   for (j=0;j<=g-1;j=j+1) {
a903      (c_1, tmp) = y_0 + s_0 × t_j;
a904      (c_2, y_NULL) = tmp + h_j×n_0   /* y_NULL is always zero when it is normal */
a905      if (y_NULL != 0) return FAULT /* fault is detected to terminate process */
a906      for (i=1;i<=g-1;i=i+1) {
a907         (c_1, tmp) = y_i + c_1 + s_i × t_j;
a908         (c_2, y_{i-1}) := tmp + c_2 + h_j × n_i;
a909      }
a910      (c_2, c_1) = C_1 + C_2 + y_g;
a911      y_{g-1} = C_1;
a912      y_g = C_2;
a913   }
a914   if (y>=n) y = y−n;
a915   return y;
```

In algorithm 9, h is given as data obtained by calculation performed beforehand ($h=s\times t\times n'(\mod 2^f)$ instead of calculating h dynamically in response to the interval variable of a Montgomery multiplication remainder; in other words, it is given as the lower bits of the resultant value of the multiplication.

In algorithm 9, a value $h_j$, which is one of the values $h=(h_{g-1}, \ldots, h_0)$ obtained by dividing h in units of words, is used for performing a Montgomery modular multiplication operation.

While the process of algorithm 8 only detects the occurrence of a fault during the calculations corresponding to steps a803 and 804, the process of algorithm 9 can detect the occurrence of a fault during the calculations in steps a903 through a908. More precisely, the process of algorithm 9 can detect the occurrence of a fault during half of the calculations in steps a903 through a908, although it does not detect all the occurrences of a fault during all the calculations.

Figure 9:
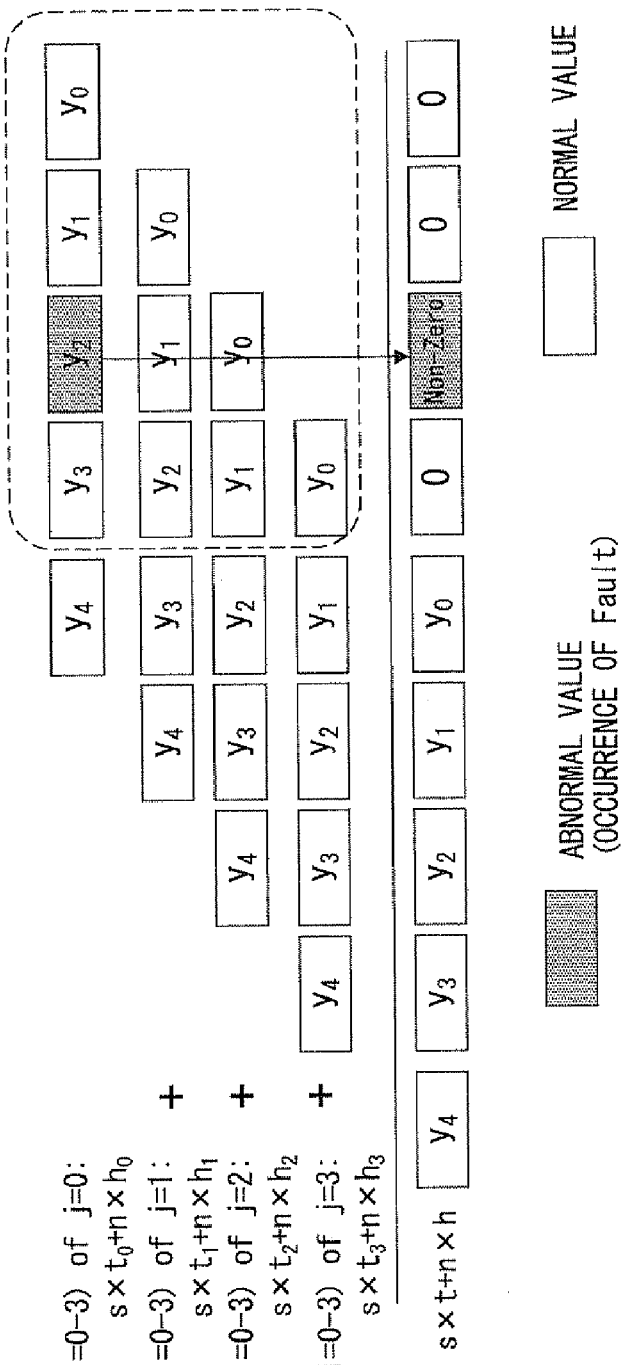
FIG. 9 schematically illustrates the principle of the fault detection method according to the second embodiment of the present invention.

FIG. 9 illustrates a calculation process that can detect the occurrence of a fault among steps a903 through a908 in algorithm 9 where g=4. The reason that the occurrence of a fault can be detected only in half of the entire calculation is that the bit values of the lower half of (s×t)+(h×n) calculated in the Montgomery modular multiplication described in algorithm 3 (i.e., the values of the lower f bits) are zero.

Embodiment 2-1

Basic Circuit for Algorithm 9

Figure 10:
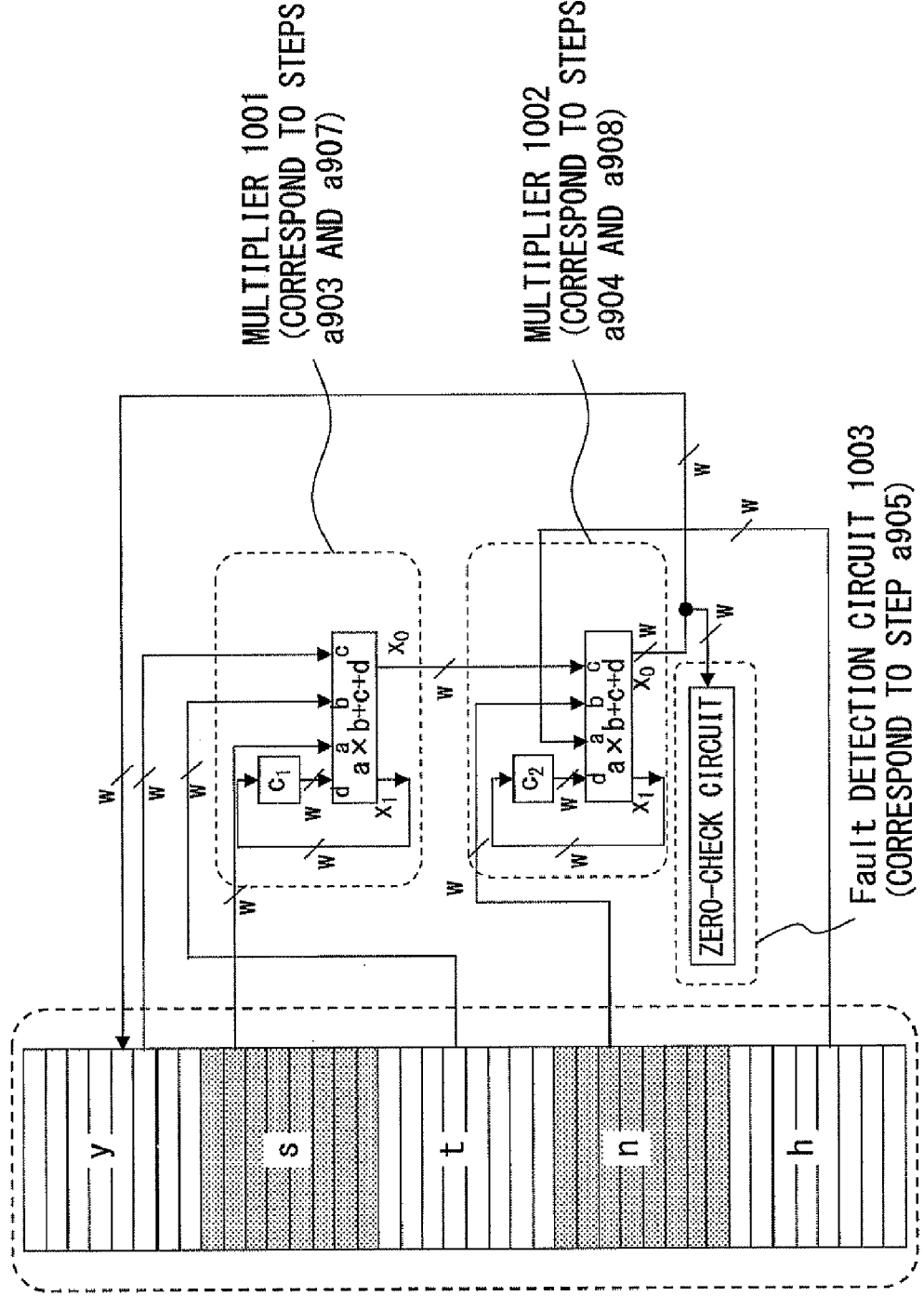
FIG. 10 illustrates a configuration of a circuit 1000 that can implement the fault detection method according to the second embodiment of the present invention.
Figure 11:
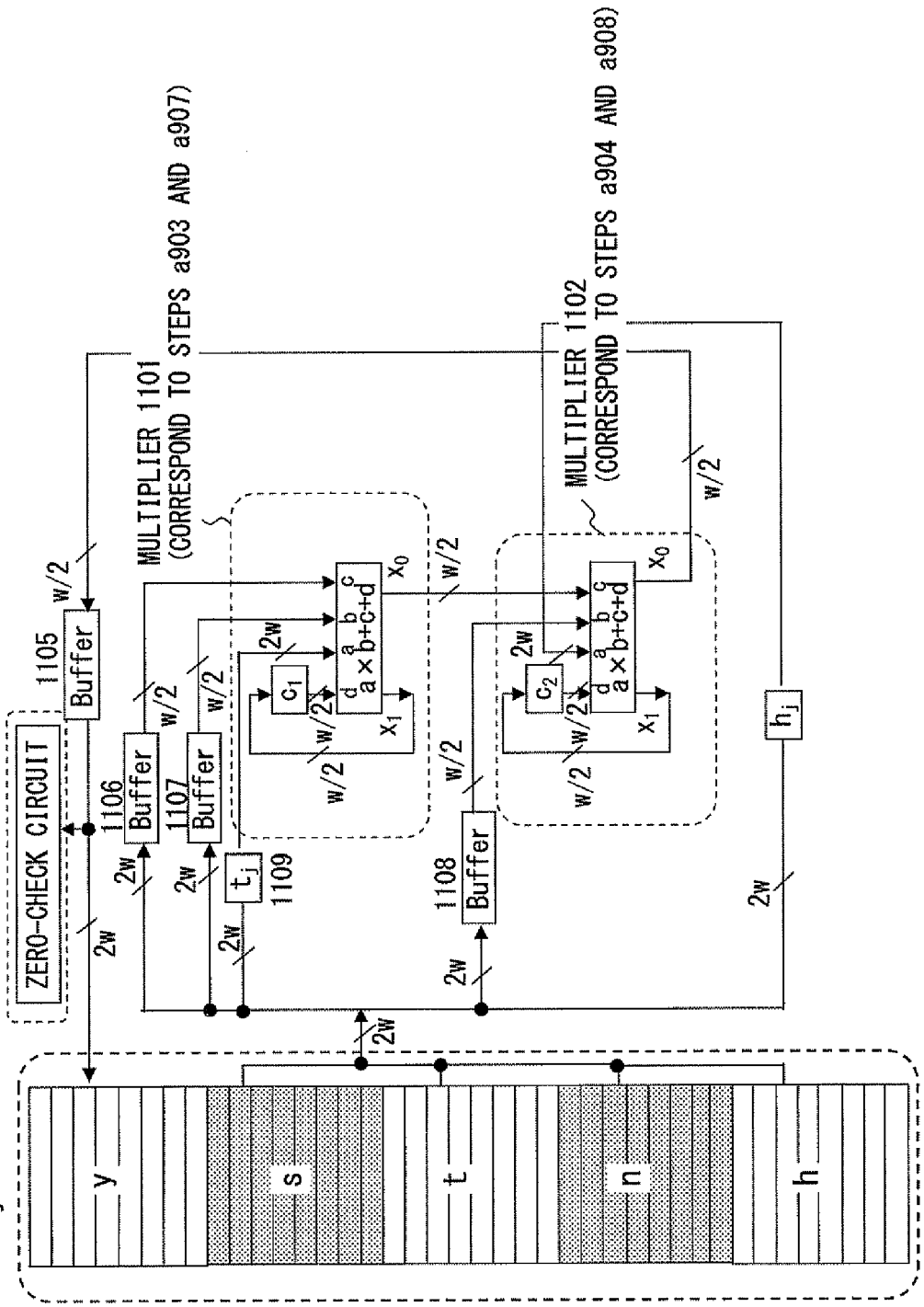
FIG. 11 illustrates a configuration of a circuit that can implement the fault detection method according to the second embodiment of the present invention and to which a memory bandwidth reduction technique is applied.

FIG. 10 illustrates one example of implementing algorithm 9 in the form of circuit. A circuit 1000 in FIG. 10 includes a multiplier 1001 for executing the multiply-addition-addition in steps a903 and a907 in algorithm 9, a multiplier 1002 for executing the multiply-addition-addition in steps a904 and a908, a fault detection circuit 1003, and a memory circuit 1004 for storing input/output data s, t, y, n, and h. The fault detection circuit 1003 determines whether or not the values of the lower w bits of the output from the multiplier 1002 are zero in order to detect a fault.

Embodiment 2-2

Circuit for Algorithm 9 Including Buffer Configuration

The same buffer as in embodiment 1-2 above can be added to the circuit 1000.

FIG. 8 illustrates a configuration of a circuit 1100 in which the circuit 1000 is used as its fundamental element and the above described technique of reducing memory bandwidth is used. The circuit 1100 includes a multiplier 1101 for performing the multiply-addition-addition operations in steps a903 and a907 in algorithm 9, a multiplier 1102 for performing the multiply-addition-addition operations in steps a904 and a908, a fault detection circuit 1103, a memory circuit 1104 for storing input/output data s, t, y, n, and h, and buffer circuits 1105 through 1109. The effects of these buffer circuits 1105 through 1109 permit the circuit 1100 to optimize a memory bandwidth similarly to the circuit 800.

The fault detection circuit 1103 in the circuit 1100 determines whether or not a 2w-bit value output from the buffer circuit 1105 buffering the output of the multiplier 1102 includes a value that is not zero in order to detect a fault.

Embodiment 3

When n' that has been Calculated Beforehand is Used

As another embodiment, the present invention can be implemented by using an algorithm using $n'=-n^{-1} \pmod{2^f}$ that has been calculated beforehand. An example of such an algorithm is described below as algorithm 10.

<Algorithm 10: Implementation Algorithm of Montgomery Multiplication Remainder in which Condition of Detecting Fault is Changed (n' is Calculated Beforehand)

Input
s: f-bit integer
t: f-bit integer
R: $R=2^f$
n: modulus of remainder, f-bit odd value
n': $n'=-n^{-1} \pmod{2^f}$
Output
$REDC(A,B)=A \times B \times R^{-1} \pmod N$
Multi-Precision Integers
$s=(s_{g-1}, \ldots, s_0)$
$t=(t_{g-1}, \ldots, t_0)$
$n=(n_{g-1}, \ldots, n_0)$
$h=(h_{g-1}, \ldots, h_0)$
$n'=(n'_{g-1}, \ldots, n'_0)$, where $n'=-n^{-1} \pmod{2^f}$
$y=(y_g, \ldots, y_0)$
$z=(z_{2g-1}, \ldots, z_0)$
$z'=(z'_{2g-1}, \ldots, z'_0)$
W-Bit Word Data, where $r=2^w$.
tmp, c
Algorithm

```
a1001    y=0, z=0, z'=0, h=0;
a1002    for (j=0;j<=g-1;j=j+1) {  /* calculation of z = s×t */
a1003        c=0;
a1004        for (i=1;i<=g-1;i=i+1) {
a1005            (c, z_{i+j}) = z_{i+j} + c + s_i × t_j;
a1006        }
a1007        z_{g+j} = c;
a1008    }
a1009    for (j=0;j<=g-1;j=j+1) {  /* calculation of h= z×n' (mod 2^f) */
a1010        c=0;
a1011        for (i=1;i<=g-1-j;i=i+1) {
a1012            (c, h_{i+j}) = h_{i+j} + c + z_i × n'_j;
a1013        }
a1014    }
a1015    for (j=0;j<=g-1;j=j+1) {  /* calculation of z' = h×n */
a1016        c=0;
a1017        for (i=1;i<=g-1;i=i+1) {
a1018            (c, z'_{i+j}) = z'_{i+j} + c + h_i × n_j;
a1019        }
a1020        z'_{g+j} = c;
a1021    }
a1022    c=0; /* calculation of y = (z+z')/2^f */
a1023    for (j=0;j<=2g-1;j=j+1 {
a1024        (c, tmp) = z_j + z'_j +c;
a1025        if (j<g) {(check the value of tmp, and when it is
            nonzero, a fault is determined to have occurred)
a1026        } else {y_j = tmp};
a1027    }
a1028    y_g=c;
a1029    if (y>=n) y = y-n;
a1030    return y;
```

Algorithm 9 requires two-step calculations (i.e., "calculation of n'" and "calculation of h from n', s, and t") to be performed beforehand while algorithm 10 requires only the calculation of n' to be performed beforehand, which can simplify the parameters for calculations performed beforehand.

Figure 12:
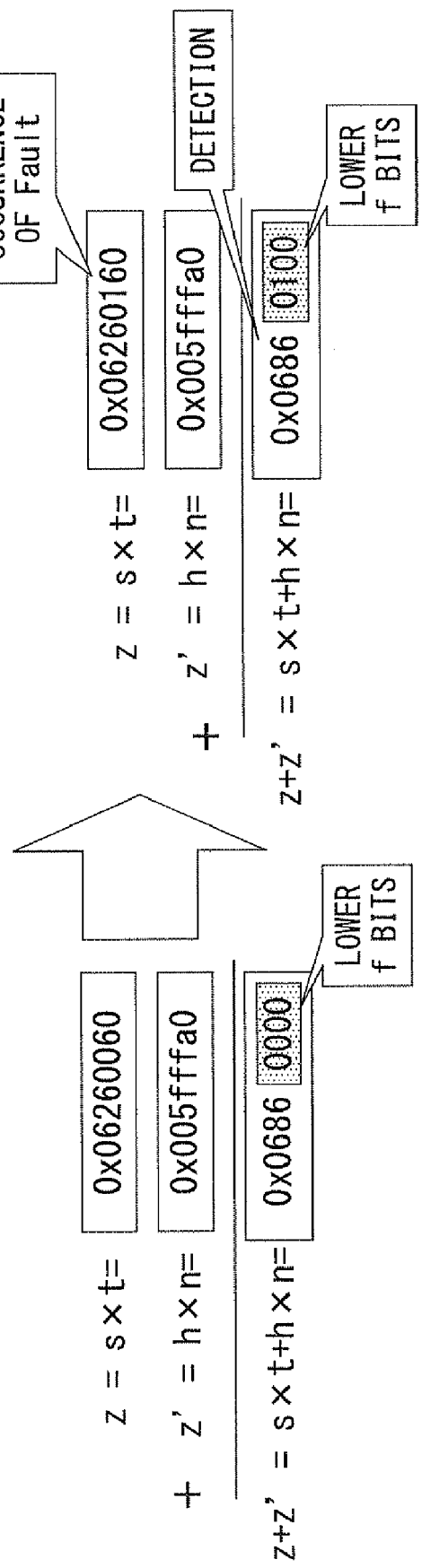
FIG. 12 illustrates an algorithm according to the third embodiment of the present invention.

FIG. 12 schematically illustrates the flow in algorithm 10. $z+z'=(s \times t)+(h \times n)$ is satisfied, and s, t, h, and n are f-bit integers, and z and z' are 2f-bit integers. The values of the lower f bits of z+z' are all zero if those values are normal, and thus checking whether this portion includes a nonzero value enables the detection of the occurrence of a fault.

All of the above described circuits in the present invention can be included in a common smart card (including IC card).

FIG. 13 schematically illustrates a hardware configuration to implement the programs according to the present invention, in which a CPU 1300, memory 1302, an input device 1304, an output device 1306, an external storage device 1308, a medium driving device 1310, a portable storage medium 1312, and a network connection device 1314 are connected to each other via a bus 1316. The programs according to the present invention can be stored in the portable storage medium 1312 that is driven by the external storage device 1308 or the medium driving device 1310. The hardware can be connected to a network via the network connection device 1314 in order to input and output the programs according to the present invention via the input device 1304 and the output device 1306.

The use of the present invention enables the checking of a data value that becomes "0" when there is no occurrence of a fault, in order to enable instantaneous detection of the occurrence of a fault, which cannot be realized by the conventional methods, and thereby the problems of security can be solved.

Also, the circuits according to the present invention can detect the occurrence of a faulty state in the internal processing of Montgomery multiplication remainder operations, and thus can be applied to smart cards having functions of various types of public key cryptography using Montgomery multiplication remainder operations.

What is claimed is:

1. A cryptographic processing device, comprising:
  a memory circuit;
  a Montgomery modular multiplication operation circuit performing a Montgomery modular multiplication operation plural times for a value set having f-bit values s, t, n, and h and a w-bit value n' to store them in the memory circuit (where f and w are natural numbers); and
  a fault attack detection circuit determining whether or not a fault attack occurred for each of at least some parts of the Montgomery modular multiplication operations performed plural times, wherein
  the Montgomery modular multiplication operation is $y=\text{REDC}(s, t, n)=s \times t \times 2^{-f} \pmod{n}$ (where y is an f-bit value and REDC is a Montgomery reduction algorithm),
  the fault attack detection circuit determines that a fault attack occurred when a digit in lower f bits of the value of $s \times t + h \times n$ calculated by the Montgomery modular multiplication operation circuit involves a value that is not zero, and
  values in the mathematical expressions satisfy $h = s \times t \times n' \pmod{2^f}$, and $n' = -n^{-1} \pmod{2^f}$.

2. The cryptographic processing device according to claim 1, further comprising:
  a function suspending unit for suspending a function of the cryptographic processing device when the fault attack detection circuit detected a fault attack.

3. A cryptographic processing device, comprising:
  a memory circuit;
  a Montgomery modular multiplication operation circuit calculating an f-bit value (where f is a natural number) expressed by using (g+1) variables of w bits, where $y=(y_g, \ldots, y_1, y_0)$, said f-bit value satisfying a Montgomery modular multiplication operation $y=\text{REDC}(s, t, n)=s \times t \times 2^{-f} \pmod{n}$ for a value set having f-bit values expressed by using g variables of w bits (where g is a natural number and REDC is a Montgomery reduction algorithm), where $s=(s_{g-1}, \ldots, s_1, s_0)$, $t=(t_{g-1}, \ldots, t_1, t_0)$, $n=(n_{g-1}, \ldots, n_1, n_0)$, and $h=(h_{g-1}, \ldots, h_1, h_0)$ and a w-bit value $n'_0$; and
  a fault attack detection circuit storing, in a variable $y_{NULL}$, a value of lower w bits of $(s \times t_i)+(h_i \times n)$ (where i is an integer satisfying $0 \leq g-1$) calculated by the Montgomery modular multiplication operation circuit, and determining that a fault attack occurred when the variable $y_{NULL}$ is nonzero, wherein
  values in the mathematical expressions satisfy:

$f > w$;

$h_i \in h = (h_{g-1}, \ldots, h_1, h_0)$, $h = s \times t \times n' \pmod{2^f}$ (where i is above a described value); and $n'_0 = n' \pmod{2^w}$, $n' = -n^{-1} \pmod{2^f}$.

4. The cryptographic processing device according to claim 3, further comprising:
  a w-bit×w-bit multiplication circuit performing multiplication of w-bit×w-bit to output the result as the variable $y_{NULL}$ by using data read in units of w bits respectively from the memory circuit and the Montgomery modular multiplication operation circuit.

5. The cryptographic processing device according to claim 3, further comprising:
  a first buffer circuit reading data in units of (k*w) bits from the memory circuit in one reading process so as to output data in units of (w/k) bits;
  a (k*w)-bit×(w/k)-bit multiplication circuit performing multiplication of (k*w)-bit×(w/k)-bit by reading data from the memory circuit in units of (k*w) bits and also by reading data from the first buffer circuit in units of (w/k) bits so as to output part of the variable $y_{NULL}$; and
  a second buffer circuit accumulating the part of the variable $y_{NULL}$ output from the (k*w)-bit×(w/k)-bit multiplication circuit, and treating an accumulated value as a (k*w)-bit value, wherein
  k is a natural number.

6. A cryptographic processing device, comprising:
  a memory circuit;
  a Montgomery modular multiplication operation circuit calculating an f-bit value expressed by using (g+1) variables of w bits, where $y=(y_g, \ldots, y_1, y_0)$, said f-bit value satisfying a Montgomery modular multiplication operation $y=\text{REDC}(s, t, n)=s \times t \times 2^{-f} \pmod{n}$, (where REDC is a Montgomery reduction algorithm) for a value set having f-bit values expressed by using g variables of w bits, where $s=(s_{g-1}, \ldots, s_1, s_0)$, $t=(t_{g-1}, \ldots, t_1, t_0)$, $n=(n_{g-1}, \ldots, n_1, n_0)$, and $h=(h_{g-1}, \ldots, h_1, h_0)$ and a w-bit value $n'_0$ to store them in the memory circuit (where g, w and f are natural numbers); and
  a fault attack detection circuit storing, in a variable $y_{NULL}$, a value of lower w bits of $(s \times t_0)+(h' \times n)$ calculated by the Montgomery modular multiplication operation circuit, and determining that a fault attack occurred when the variable $y_{NULL}$ is nonzero, wherein
  values in the mathematical expressions satisfy:

$f > w$;

$h = s \times t \times n' \pmod{2^f}$; and $n'_0 = n' \pmod{2^w}$, $n' = -n^{-1} \pmod{2^f}$;

and
  the Montgomery modular multiplication operation circuit dynamically updates h' in the mathematical expression as below each time a loop variable j is updated for a variable b:

$h' = ((a_0 \times b_j) + y_0 \times n'_0) \pmod{2^w}$.

7. The cryptographic processing device according to claim 6, further comprising:
  a w-bit×w-bit multiplication circuit performing multiplication of w-bit×w-bit to output the result as the variable $y_{NULL}$ by using data read in units of w bits respectively from the memory circuit and the Montgomery modular multiplication operation circuit.

8. The cryptographic processing device according to claim 6, further comprising:
  a first buffer circuit reading data in units of (k*w) bits from the memory circuit in one reading process so as to output data in units of (w/k) bits;
  a (k*w)-bit×(w/k)-bit multiplication circuit performing multiplication of (k*w)-bit×(w/k)-bit by reading data from the memory circuit in units of (k*w) bits and also by reading data from the first buffer circuit in units of (w/k) bits so as to output part of the variable $y_{NULL}$; and a second buffer circuit accumulating the part of the variable $y_{NULL}$ output from the (k*w)-bit×(w/k)-bit multiplication circuit, and treating an accumulated value as a (k*w)-bit value, wherein k is a natural number.

9. A cryptographic processing device, comprising:

a memory circuit;

a Montgomery modular multiplication operation circuit calculating an f-bit value expressed by using (g+1) variables of w bits, where $y=(y_g, \ldots, y_1, y_0)$, said f-bit value satisfying a Montgomery modular multiplication operation $y=REDC(s, t, n)=s\times t\times 2^{-f} \pmod{n}$, (where REDC is a Montgomery reduction algorithm) for a value set having f-bit values expressed by using g variables of w bits, where $s=(s_{g-1}, \ldots, s_1, s_0)$, $t=(t_{g-1}, \ldots, t_1, t_0)$ and $h=(h_{g-1}, \ldots, h_1, h_0)$ to store them in the memory circuit (where f, g and w are natural numbers); and a fault attack detection circuit storing, in a variable $y_{NULL}$ a value of lower w bits of $(s\times t_0)+(h_j\times n)$ calculated by the Montgomery modular multiplication operation circuit, and determining that a fault attack occurred when the variable $y_{NULL}$ is nonzero, wherein:

values in the mathematical expressions satisfy:

$f > w$;

$h = s \times t \times n' \pmod{2^f}$; and $n' = -n^{-1} \pmod{2^f}$, and h in the mathematical expressions is given before the Montgomery modular multiplication circuit performs a calculation.

10. The cryptographic processing device according to claim 9, further comprising:

a w-bit×w-bit multiplication circuit performing multiplication of w-bit×w-bit to output the result as the variable $y_{NULL}$ by using data read in units of w bits respectively from the memory circuit and the Montgomery modular multiplication operation circuit.

11. The cryptographic processing device according to claim 9, further comprising:

a first buffer circuit reading data in units of (k*w) bits from the memory circuit in one reading process so as to output data in units of (w/k) bits;

a (k*w)-bit×(w/k)-bit multiplication circuit performing multiplication of (k*w)-bit×(w/k)-bit by reading data from the memory circuit in units of (k*w) bits and also by reading data from the first buffer circuit in units of (w/k) bits so as to output part of the variable $y_{NULL}$; and a second buffer circuit accumulating the part of the variable $y_{NULL}$ output from the (k*w)-bit×(w/k)-bit multiplication circuit, and treating an accumulated value as a (k*w)-bit value, wherein k is a natural number.

12. The cryptographic processing device according to claim 11, wherein k=2 is satisfied.

13. A smart card, comprising:

a cryptographic processing device, wherein the cryptographic processing device includes a memory circuit, a Montgomery modular multiplication operation circuit performing a Montgomery modular multiplication operation plural times for a value set having f-bit values s, t, n, and h and a w-bit value n' to store them in the memory circuit (where f and w are natural numbers), and a fault attack detection circuit determining whether or not a fault attack occurred for each of at least some parts of the Montgomery modular multiplication operations performed plural times, wherein the Montgomery modular multiplication operation is $y=REDC(s, t, n)=s\times t\times 2^{-f} \pmod{n}$ (where y is an f-bit value and REDC is a Montgomery reduction algorithm), the fault attack detection circuit determines that a fault attack occurred when a digit in lower f bits of the value of $s\times t+h\times n$ calculated by the Montgomery modular multiplication operation circuit involves a value that is not zero, and values in the mathematical expressions satisfy $h = s \times t \times n' \pmod{2^f}$, and $n' = -n^{-1} \pmod{2^f}$.

14. A cryptographic processing method, comprising:

performing, by a Montgomery modular multiplication operation circuit, a Montgomery modular multiplication operation plural times for a value set having f-bit values s, t, n, and h and a w-bit value n' to store them in a memory circuit (where f and w are natural numbers), wherein the Montgomery modular multiplication operation is $y=REDC(s, t, n)=s\times t\times 2^{-f} \pmod{n}$ (where y is an f-bit value and REDC is a Montgomery reduction algorithm); and detecting a fault attack by determining that a fault attack occurred when a digit in lower f bits of the value of $s\times t+h\times n$ calculated by the performing includes a value that is not zero, wherein values in the mathematical expressions satisfy:

$h = s \times t \times n' \pmod{2^f}$, and $n' = -n^{-1} \pmod{2^f}$.

15. A non-transitory computer-readable medium containing a program causing a computer including memory circuit to execute a cryptographic process, the cryptographic process comprising:

setting f-bit values s, t, n, and h and a w-bit value n' to store them in the memory circuit (where f and w are natural numbers);

performing, by a Montgomery modular multiplication operation circuit, a Montgomery modular multiplication operation plural times for a value set having f-bit values s, t, n, and h and a w-bit value n' to store them in a memory circuit (where f and w are natural numbers), wherein the Montgomery modular multiplication operation is $y=REDC(s, t, n)=s\times t\times 2^{-f} \pmod{n}$ (where y is an f-bit value and REDC is a Montgomery reduction algorithm); and detecting a fault attack by determining that a fault attack occurred when a digit in lower f bits of the value of $s\times t+h\times n$ calculated by the performing includes a value that is not zero, wherein values in the mathematical expressions satisfy:

$h = s \times t \times n' \pmod{2^f}$, and $n' = -n^{-1} \pmod{2^f}$.

* * * * *